UNITED STATES PATENT OFFICE.

CHRISTOPHER RIS, OF BASLE, SWITZERLAND, ASSIGNOR TO JOHN R. GEIGY & CO., OF SAME PLACE.

BENZIDIN-ORANGE.

SPECIFICATION forming part of Letters Patent No. 601,063, dated March 22, 1898.

Application filed July 22, 1897. Serial No. 645,610. (Specimens.)

*To all whom it may concern:*

Be it known that I, CHRISTOPHER RIS, a citizen of the Republic of Switzerland, residing in Basle, in said Republic of Switzerland, have invented certain new and useful Improvements in the Production of an Orange Coloring-Matter, of which the following is a specification.

This invention relates to the manufacture of an improved orange coloring-matter; and it consists of the process and product hereinafter described.

In carrying out my process, for instance, twenty-five kilograms of a paste containing thirty-three per cent. of sulfate of benzidin or of diamidophenyltolyl or of tolidin are carefully mixed with a solution of seventeen kilograms of paranitrotoluolsulfo-acid and fifty liters of water. The mass is then heated to the boiling-point, after which twenty kilograms of caustic soda-lye of forty degrees Baumé are added. The reaction which then takes place manifests itself, first, by a red color, and then in the solution of the benzidin, and then, after a short time, by an impetuous ebullition. The mass assumes a deep orange color and becomes thick. When the reaction is finished, the resulting mass is dissolved in about two hundred liters of water, separated by the addition of common salt, and then treated in the usual way. The dyestuff thus obtained forms a brownish powder, which is easily soluble in water with a deep orange color, scarcely soluble in alcohol, and readily soluble in concentrated sulfuric acid with a red-violet color. The watery solution when mixed with acids yields a brown precipitate that is scarcely soluble in boiling water. When treated with reducing agents—for instance, with protochlorid of tin and hydrochloric acid—the benzidin or its homologues are regenerated from the coloring-matter and may be easily identified by the addition of Glauber salt to the filtrate, so that the insoluble sulfates are precipitated. Among other products of reduction diamidostilbendisulfo-acid is found. According to these reactions my improved orange coloring-matter has the following formula:

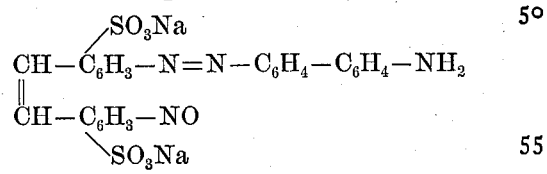

It can be considered as a real azo dyestuff and may be denominated as the "sodium salt of nitrosostilbendisulfo-acid-azo benzidin."

Having thus described my invention, I claim as new and desire to secure by Letters Patent—

1. The process herein described of making an orange coloring-matter, which consists in condensing a paradiamin, such as benzidin, with paranitrotoluolsulfo-acid in a solution of a caustic alkali, substantially as set forth.

2. The new orange coloring-matter herein described, which is obtained by the condensation of a paradiamin, such as benzidin, with paranitrotoluolsulfo-acid in a solution containing a caustic alkali, it being a brownish powder which is easily soluble in water with a deep orange color, scarcely soluble in alcohol, soluble in concentrated sulfuric acid with a red-violet color, precipitated by acids from its watery solution in brown flocks, and giving when treated with reducing agents, benzidin or its homologues, substantially as set forth.

In testimony that I claim the foregoing as my invention I have signed my name in presence of two subscribing witnesses.

CHRISTOPHER RIS.

Witnesses:
GEORGE GIFFORD,
CHARLES FRAEHELIN.